| (12) | United States Patent | (10) Patent No.: | US 12,359,574 B2 |
|---|---|---|---|
| | Campbell | (45) Date of Patent: | Jul. 15, 2025 |

(54) VANE ARC SEGMENT WITH SINGLE-SIDED PLATFORM

(71) Applicant: RTX CORPORATION, Farmington, CT (US)

(72) Inventor: Christian X. Campbell, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/328,128

(22) Filed: Jun. 2, 2023

(65) Prior Publication Data

US 2023/0392508 A1 Dec. 7, 2023

Related U.S. Application Data

(60) Provisional application No. 63/348,678, filed on Jun. 3, 2022.

(51) Int. Cl.
| F01D 5/28 | (2006.01) |
| F01D 5/14 | (2006.01) |
| F01D 11/00 | (2006.01) |

(52) U.S. Cl.
CPC .............. F01D 5/284 (2013.01); F01D 5/141 (2013.01); F01D 11/001 (2013.01)

(58) Field of Classification Search
CPC ......... F01D 9/041; F01D 11/001; F01D 5/141
See application file for complete search history.

(56) References Cited

U.S. PATENT DOCUMENTS

| 7,581,924 | B2 | 9/2009 | Marini et al. |
| 8,206,087 | B2 * | 6/2012 | Campbell ............. F01D 11/006 |
| | | | 416/500 |
| 8,734,925 | B2 | 5/2014 | Kweder et al. |
| 9,784,113 | B2 | 10/2017 | Fremont et al. |
| 9,915,154 | B2 | 3/2018 | Berczik et al. |
| 10,309,240 | B2 | 6/2019 | Heitman et al. |
| 10,415,399 | B2 | 9/2019 | Ducharme et al. |
| 10,443,625 | B2 | 10/2019 | Langenbrunner et al. |
| 10,577,953 | B2 | 3/2020 | Watanabe |
| 10,815,801 | B2 | 10/2020 | Watanabe |
| 10,975,706 | B2 * | 4/2021 | Farrar ..................... F01D 9/042 |
| 11,268,393 | B2 * | 3/2022 | Liles ....................... F01D 5/284 |
| 2020/0232332 | A1 | 7/2020 | Farrar et al. |
| 2021/0148241 | A1 | 5/2021 | Lilies et al. |

OTHER PUBLICATIONS

European Search Report for European Patent Application No. 23177378.9 mailed Nov. 9, 2023.

* cited by examiner

*Primary Examiner* — Courtney D Heinle
*Assistant Examiner* — John S Hunter, Jr.
(74) *Attorney, Agent, or Firm* — Carlson, Gaskey & Olds, P.C.

(57) ABSTRACT

A gas turbine engine includes a ceramic matrix composite (CMC) vane arc segments that are arranged in a circumferential row. Each of the CMC vane arc segments includes an airfoil section that defines first and second side walls, leading and trailing ends, and first and second radial ends. At the first radial end, the airfoil section has a single-sided platform that and the second side wall has a bearing surface. The single-sided platform of each of the CMC vane arc segments in the circumferential row is situated to bear against the bearing surface of the next of the CMC vane arc segments in the circumferential row.

16 Claims, 12 Drawing Sheets

VANE ARC SEGMENT WITH SINGLE-SIDED PLATFORM

CROSS-REFERENCE TO RELATED APPLICATION

The present disclosure claims benefit of U.S. Provisional Application No. 63/348,678 filed Jun. 3, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a plurality of ceramic matrix composite (CMC) vane arc segments arranged in a circumferential row. Each of the CMC vane arc segments has an airfoil section that defines first and second side walls, leading and trailing ends, and first and second radial ends. The first and second side walls and leading and trailing ends define an internal cavity. At the first radial end, the airfoil section has a single-sided platform that projects in a circumferential direction from the first side wall and, also at the first radial end, the second side wall has a bearing surface. The single-sided platform of each of the CMC vane arc segments in the circumferential row is situated to bear against the bearing surface of the next of the CMC vane arc segments in the circumferential row.

In a further embodiment of any of the foregoing embodiments, at the first radial end, the second side wall includes a ledge that borders the bearing surface.

In a further embodiment of any of the foregoing embodiments, the bearing surface is multi-faceted and includes a first facet and a second facet, the second facet overhanging the internal cavity.

In a further embodiment of any of the foregoing embodiments, the ledge has a window that opens to the internal cavity. The single-sided platform includes a circumferential side opposite the first side wall that has a tab projecting therefrom, and the tab of each of the CMC vane arc segments extends through the window, and bears against the second facet, of the next of the CMC vane arc segments in the circumferential row.

In a further embodiment of any of the foregoing embodiments, the bearing surface includes a blind pin hole. The single-sided platform includes a platform pin hole. The platform pin hole of each of the CMC vane arc segments is radially aligned with the blind pin hole of the next of the CMC vane arc segments in the circumferential row, and there a lock pin that extends through the platform pin hole and the blind pin hole.

In a further embodiment of any of the foregoing embodiments, the single-sided platform includes a circumferential side opposite the first side wall, a cantilevered arm that extends from the circumferential side, and a lap joint slot. The cantilevered arm of each of the CMC vane arc segments is disposed in the lap joint slot of the next of the CMC vane arc segments in the circumferential row to form a lap joint there between.

In a further embodiment of any of the foregoing embodiments, the cantilevered arm of each of the CMC vane arc segments bridges across the internal cavity of the next of the CMC vane arc segments in the circumferential row such that the CMC vane arc segments form a full hoop.

In a further embodiment of any of the foregoing embodiments, at the first radial end, the second side wall includes a ledge that borders the bearing surface. The ledge has a window that opens to the internal cavity, and the cantilevered arm extends through the window.

In a further embodiment of any of the foregoing embodiments, CMC fiber plies from the second side wall divide to define a portion of the bearing surface and another portion of the bearing surface is formed by a filler material.

In a further embodiment of any of the foregoing embodiments, the first side wall is a suction side wall and the second side wall is a pressure side wall.

In a further embodiment of any of the foregoing embodiments, at the second radial end, the airfoil section has an additional single-sided platform that projects from the first side wall in the circumferential direction away from the first side wall, and at the second radial end the second side wall has an additional bearing surface, and the additional single-sided platform of each of the CMC vane arc segments in the circumferential row is situated to bear against the additional bearing surface of the next of the CMC vane arc segments in the circumferential row.

In a further embodiment of any of the foregoing embodiments, at the second radial end, the airfoil section has an additional single-sided platform that projects from the second side wall in the circumferential direction away from the second side wall, and at the second radial end the first side wall has an additional bearing surface, and the additional single-sided platform of each of the CMC vane arc segments in the circumferential row is situated to bear against the additional bearing surface of the next of the CMC vane arc segments in the circumferential row.

A further embodiment of any of the foregoing embodiments includes a static support that supports the CMC vane arc segments and seals that are disposed, respectively, between the static support and the single-sided platform of each of the CMC vane arc segments.

In a further embodiment of any of the foregoing embodiments, the seals are, respectively, radially opposite the bearing surface of each of the CMC vane arc segments.

In a further embodiment of any of the foregoing embodiments, the CMC vane arc segments are formed of silicon carbide fibers disposed in a silicon carbide matrix.

A further embodiment of any of the foregoing embodiments includes a compressor section, a combustor in fluid communication with the compressor section, and a turbine section in fluid communication with the combustor, wherein the CMC vane arc segments are in the turbine section.

A gas turbine engine according to an example of the present disclosure includes a plurality of ceramic matrix composite (CMC) vane arc segments in a circumferential row. Each CMC vane arc segment has an airfoil section that defines first and second side walls, leading and trailing ends, and first and second radial ends. The first and second side walls and leading and trailing ends define an internal cavity. At the first radial end the airfoil section has a first single-sided platform projecting from the first side wall in a circumferential direction away from the airfoil section. At the second radial end the airfoil section has a second single-sided platform that projects from the second side wall in the circumferential direction away from the airfoil section. The CMC vane arc segments are held between inner and outer static supports. The outer static support supports each of the CMC vane arc segments at a first location on the first single-sided platform and the inner static support supports each of the CMC vane arc segments at a second location on the second single-sided platform such that a line of action through the first location and the second location crosses the airfoil section.

In a further embodiment of any of the foregoing embodiments, CMC vane arc segments are singlets that are non-interconnected with each other.

A method of assembly according to an example of the present disclosure includes providing a plurality of ceramic matrix composite (CMC) vane arc segments. Each of the CMC vane arc segments includes an airfoil section that defines first and second side walls, leading and trailing ends, and first and second radial ends. The first and second side walls and leading and trailing ends define an internal cavity. At the first radial end the airfoil section has a single-sided platform that projects from the first side wall in a circumferential direction away from the airfoil section and the second side wall has a bearing surface. The CMC vane arc segments are positioned at circumferentially-spaced apart radial positions in a circumferential row about a central axis, and then radially inwardly moved toward the central axis from the circumferentially-spaced apart radial positions to final radial positions. During the moving the CMC vane arc segments move toward one another such that the single-sided platform of each of the CMC vane arc segments comes to bear against the bearing surface of the next of the CMC vane arc segments in the circumferential row.

In a further embodiment of any of the foregoing embodiments, the CMC vane arc segments are pre-loaded with a pre-stress, and the pre-stress is released after the moving to the final radial position.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
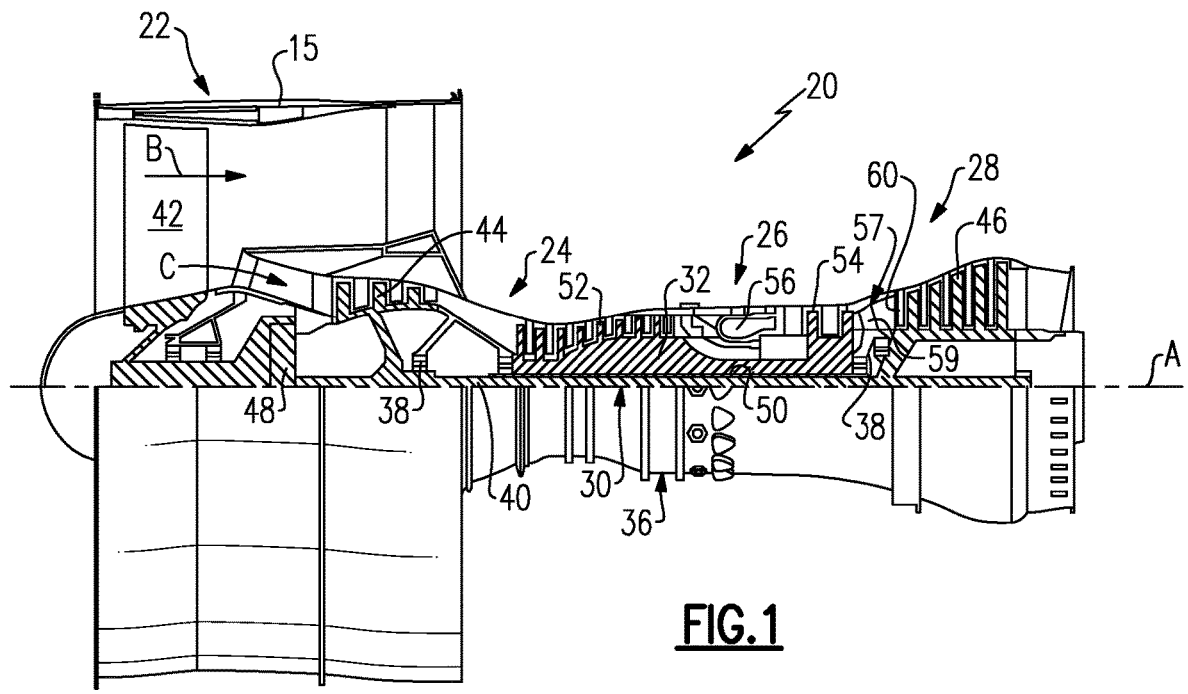
FIG. 1 illustrates as gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Vanes in a turbine section of an engine typically include an airfoil section that extends between radially inner and outer platforms that bound the core gas path. In metallic alloy vanes, the airfoil sections are substantially centered on the platforms such that the platforms have near equal overhangs on the pressure side and the suction side of the airfoil section. The circumferential sides of the platforms serve as matefaces and are often used as a sealing interface between vanes, such as with a flat seal in a seal slot. In a ceramic matrix composite (CMC) vane, however, such matefaces and sealing configurations may cause duress from thermal gradients and interlaminar stresses that are not present in metallic vanes. Moreover, turbine vanes require constraints to inhibit motion when loaded by gas path and/or secondary flow forces. Attachment of CMC vanes in an engine and management of stresses, however, is challenging. Attachment features, such as hooks, that are typically used for metallic alloy vanes can result in inefficient loading if employed in CMCs, which may also be sensitive to stress directionality and distress conditions that differ from those of metallic vanes. Additionally, hooks, seal slots, variable thickness walls, gussets, complex-geometry investment casting cores, etc. that may be used in metallic alloy components are generally not acceptable or manufacturable with CMC materials.

As CMC vanes may be single-piece integral structures, there is also considerable difficulty in bending ceramic fiber plies from the airfoil section to form the platforms. For example, the ceramic fiber plies are first laid up to form the airfoil section. The fabric that overhangs the radial ends of the airfoil section is then draped in opposite directions so as to fan out and form the suction and pressure sides of the platforms. There can be considerable difficulty in bending the fiber plies in opposite directions without forming discontinuities from folds, kinks, wrinkles, or substantial unraveling of fibers. To address one or more of the above concerns, the examples set forth herein below disclose CMC vane arc segments that have single-sided platforms.

Figure 2:
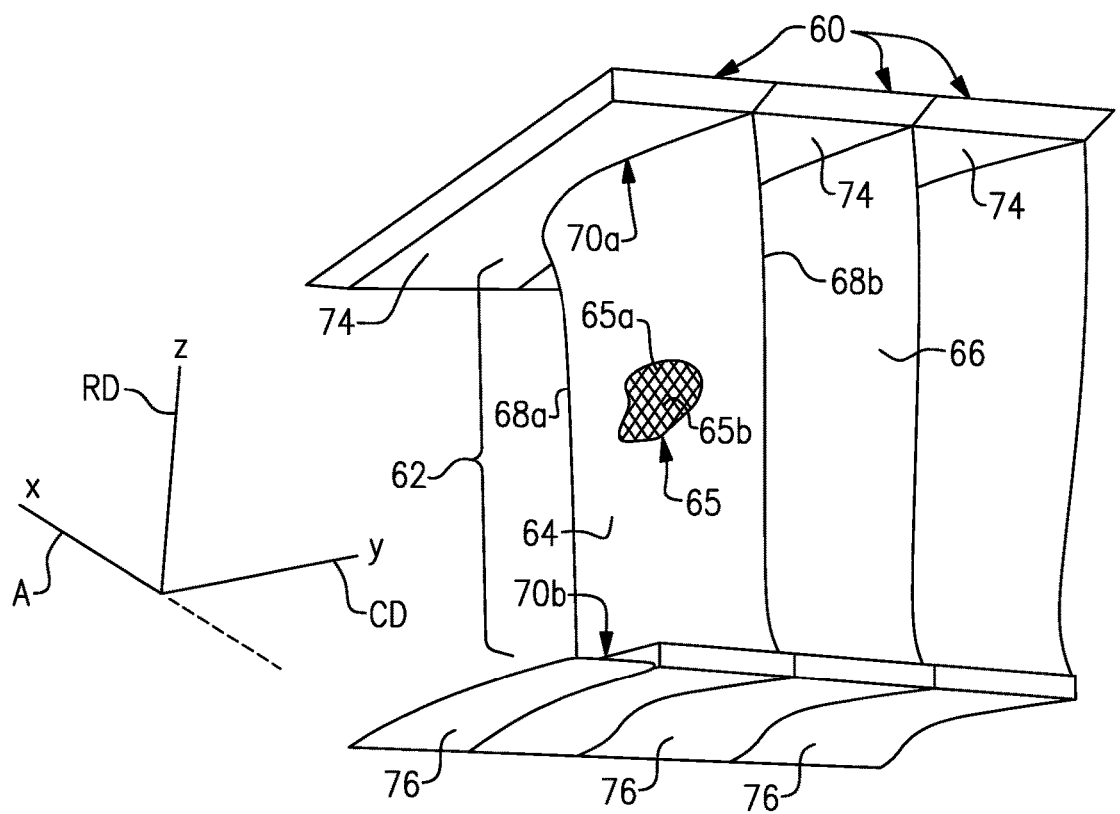
FIG. 2 illustrates a portion from the turbine section of the engine.
Figure 3:
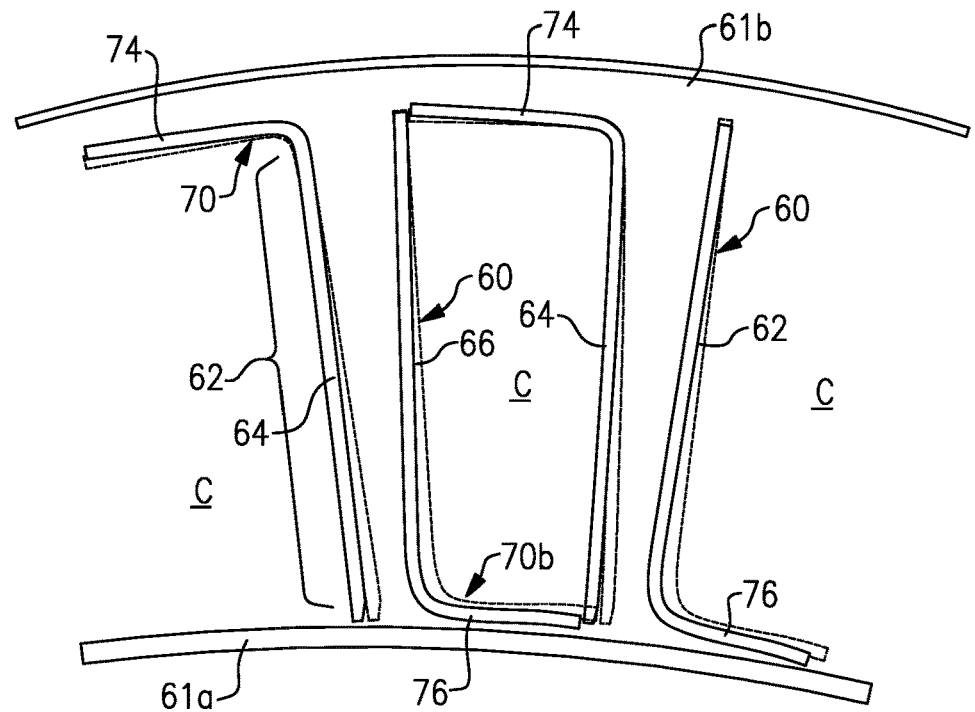
FIG. 3 illustrates an axial view of single-sided platform CMC vane arc segments from the turbine section.
Figure 4:
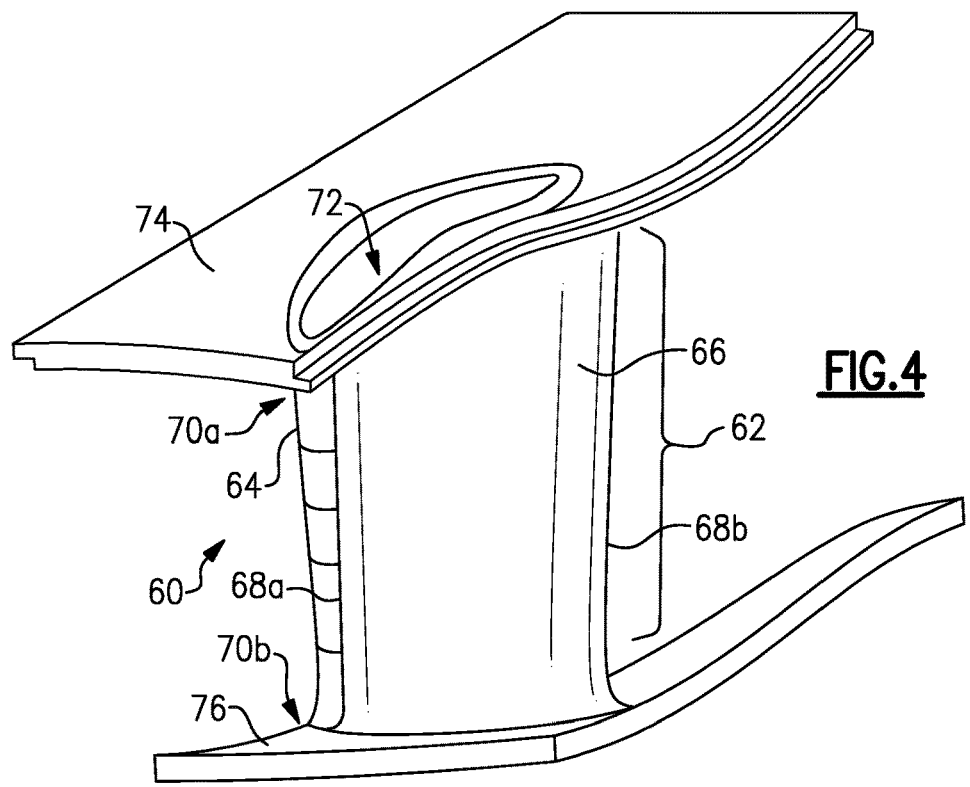
FIG. 4 illustrates an isolated view of one of the CMC vane arc segments.

FIG. 2 illustrates a representative portion of the turbine section 28 of the engine 20, including ceramic matrix composite CMC vane arc segments 60 (three shown) that are assembled in a circumferential row about the engine central longitudinal axis A (axis A is superimposed in FIG. 2, along with radial direction RD and circumferential direction CD). FIG. 3 represents an axial view of a radial cross-section through several of the CMC vane arc segments 60, and FIG. 4 shows an isolated view of a representative one of the CMC vane arc segments 60.

Each CMC vane arc segment 60 includes an airfoil section 62 that defines first and second side walls 64/66, leading and trailing ends 68a/68b, and first and second radial ends 70a/70b. In the examples herein, the first side wall 64 is a suction side of the airfoil section 62, and the second side wall 66 is a pressure side of the airfoil section 62. The side walls 64/66 and leading and trailing ends 68a/68b define an internal through-cavity 72 that may be used to convey cooling air to downstream cooling structures and components. In this example, at the first radial end 70a the airfoil section 62 has a first single-sided platform 74 projecting from the first side wall 64 in a circumferential direction away from the airfoil section 62. In this example, at the second radial end 70b, the airfoil section 62 also has a second single-sided platform 76 that projects in the circumferential direction away from the first and second side walls 64/66. As the first single-sided platform 74 projects from the first side wall 64 (suction side wall), the first single-sided platform 74 is a single-sided, suction side platform. Likewise, as the second single-sided platform 76 projects from the second side wall 66 (pressure side wall), the second single-sided platform 76 is a single-sided, pressure side platform. It is to be appreciated that in addition to the configuration shown various other configurations of the platforms are also contemplated, such as both platforms 74/76 being suction side, both platforms 74/76 being suction side, or the platform 74 being pressure side and the platform 76 being suction side.

The terms such as "inner" and "outer" refer to location with respect to the central engine axis A, i.e., radially inner or radially outer. Moreover, the terminology "first" and "second" as used herein is to differentiate that there are two architecturally distinct structures. It is to be further understood that the terms "first" and "second" are interchangeable in the embodiments herein in that a first component or feature could alternatively be termed as the second component or feature, and vice versa.

The CMC material 65 from which the CMC vane arc segments 60 are made (shown in a cutaway section in FIG. 2) is comprised of a ceramic reinforcement 65a, which is usually continuous ceramic fibers, in a ceramic matrix 65b. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. The fiber plies have a fiber architecture, which refers to an ordered arrangement of the fiber tows relative to one another, such as a 2D woven ply or a 3D structure. The CMC vane arc segments 60 may be one-piece structures in which at least a portion of the fiber plies are continuous from the platform 74, through the airfoil section 62, and into the platform 76.

The CMC vane arc segments 60 may be supported between inner and outer static supports 61a/61b (FIG. 3). Each of the static supports 61a/61b may independently be, but are not limited to, an engine case, a full hoop ring, a ring arc segment, or an intermediate structure that is attached to any of these. In the illustrated example, there is no connection between adjacent CMC vane arc segments 60 in the circumferential row. Each CMC vane arc segment 60, therefore, must carry its own aerodynamic loads by contact points or regions on single-sided platforms 74/76 where the loads are transmitted into the static supports 61a/6 1b. As the platforms 74/76 are on opposite sides of the airfoil section 62, the line of action between the points or region where the loads are transmitted crosses the airfoil section 62 and represents a cross-corner loading state. A wheelbase, i.e., the distance between the cross-corner points or regions on the platforms 74/76 where the loads are transmitted to the static structures 61a/61b, determines the load-carrying capacity of the vane arc segment 60. In general, increasing the wheelbase (length) corresponds to an increase in load-carrying capacity.

Figure 5:
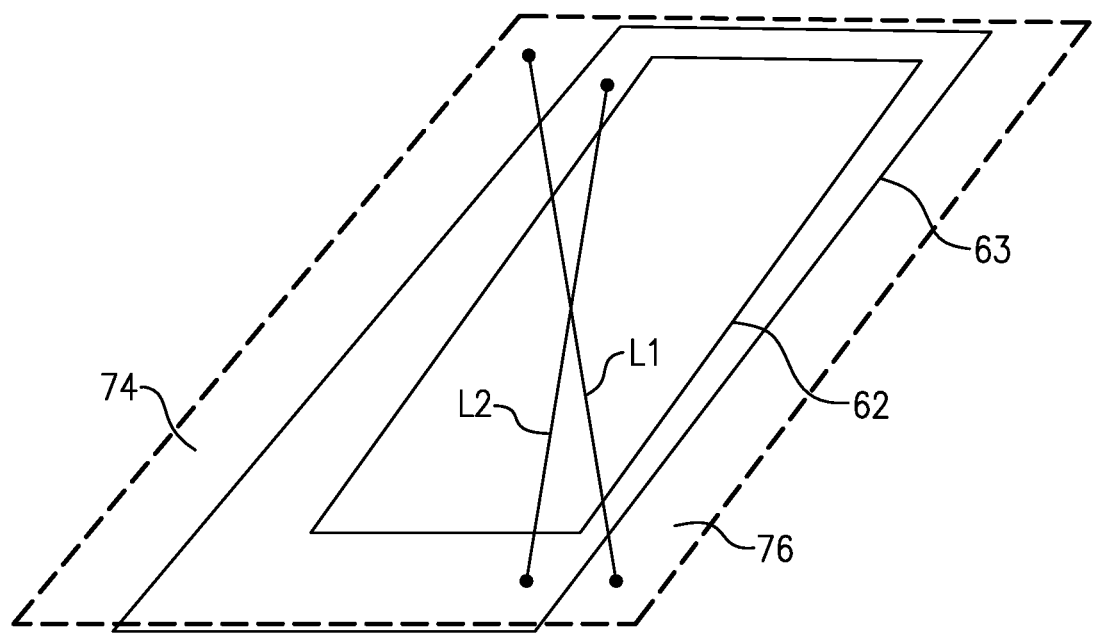
FIG. 5 illustrates a wheelbase comparison between a single- and double-sided platform.

The increased wheelbase is further demonstrated in FIG. 5 against superimposed comparison double-sided platforms 63. Lines L1 and L2 represent, respectively, the wheelbase lengths of the platforms 74/76 versus the platforms 63. The wheelbase length L1 is greater than the wheelbase length L2, thereby representing the greater load-carrying capacity of the vane arc segment 60. For instance, the wheelbase length L1 is greater than L2 by at least 5% or at least 10%. That is, since the platforms 74/76 are single-sided and thus facilitate bending of the ceramic fiber plies during fabrication, the platforms 74/76 can each be made longer in the circumferential direction than a double-sided platform. In contrast, if the platforms 74/76 were on the same side of the airfoil section 62, the load-carrying capacity would be expected to be lower and may be lower than the double-sided platforms 63. The platforms 74/76 may also exhibit increased flexibility due to the longer moment arm, which may facilitate reduction in sensitivities to manufacturing tolerances. Additionally, since the CMC vane arc segments 60 are not interconnected and, prior to assembly into the engine 20, are separate pieces, the segments 60 can be fully pre-fabricated, including with any coatings machined features. Processes such as coating deposition and machining are easier to conduct while the segments 60 are separated, and singlets such as the segments 60 are generally easier to manufacture than doublets. For example, in vane doublets or triplets it may be difficult to for line-of-sight processes to access regions between the airfoil sections.

Figure 6:
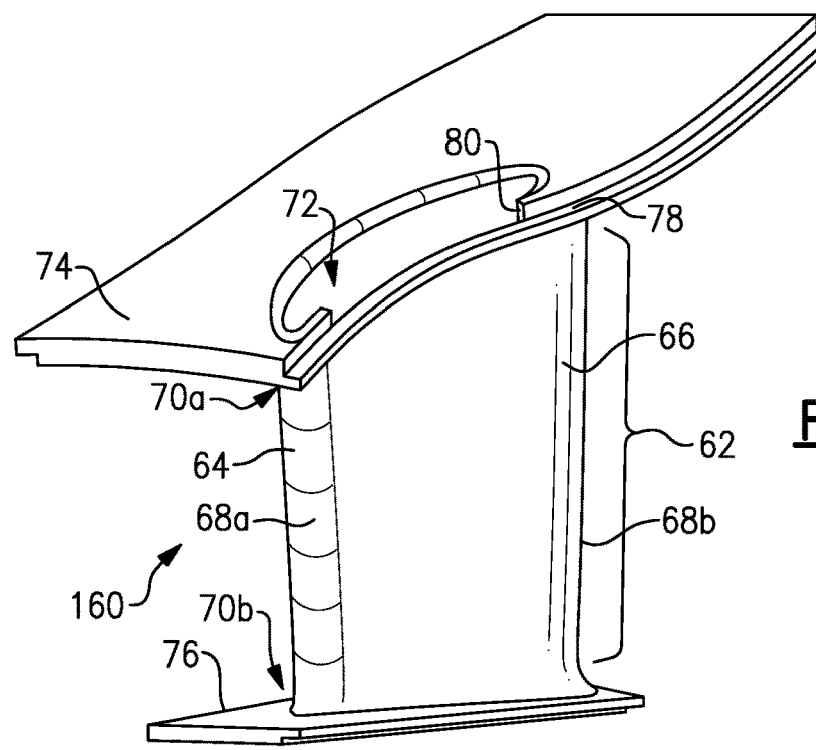
FIG. 6 illustrates an isolated view of another single-sided platform CMC vane arc segment that has a bearing surface and ledge.
Figure 7:
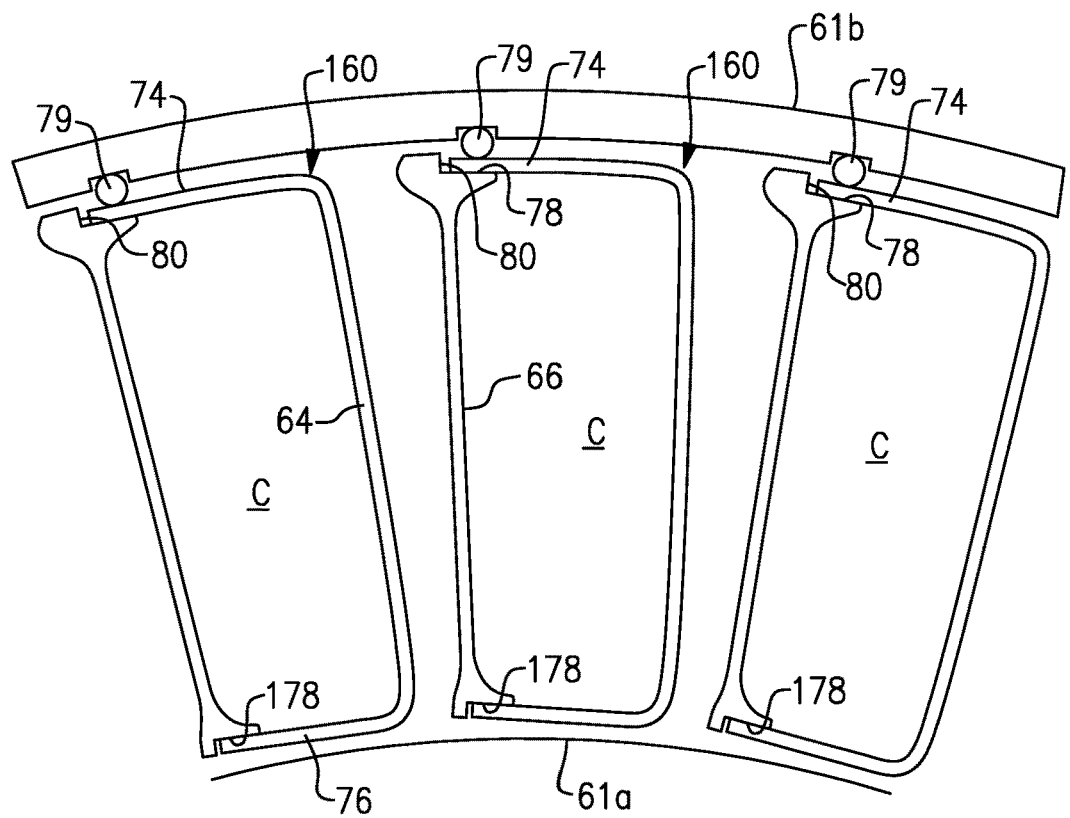
FIG. 7 illustrates an axial view of CMC seal arc segments as in FIG. 6.

FIG. 6 illustrates an isolated view of another example CMC vane arc segment 160, and FIG. 7 illustrates an axial view of a portion of a circumferential row of the CMC vane arc segments 160. The CMC vane arc segments 160 are similar to the segments 60 except that at the first radial end 70a the second side wall 66 has a bearing surface 78, enabling interconnection between the segments 160. The bearing surface 78 is situated along the circumferential edge of the single-sided platform 74 to the pressure side of the airfoil section 62. The bearing surface 78 may be a substantially flat and smooth face. For example, the bearing surface 78 may be formed by machining after densification of the CMC material 65, or alternatively during the fiber ply layup process.

As shown in FIG. 7, each of the CMC vane arc segments 160 is situated with the edge region of the single-sided platform 74 bearing, at least at times, against the bearing surface 78 of the next of the CMC vane arc segments 160 in the circumferential row, although actual contact may vary depending on conditions and loading state. In this manner, the CMC vane arc segments 160 are modestly interconnected and may act as a vane multiplet unit. In a vane multiplet unit, the segments 160 at the ends of the unit are not interconnected with the end segment 160 of the next unit in the circumferential row.

A vane multiplet unit can carry higher loads than a singlet configuration where each segment carries its own loads (e.g., the segments 60). For instance, the interconnected CMC vane arc segments 160 generate an effective wheelbase that is greater the wheelbase that can be achieved in a vane singlet such as the segment 60. As a result, the multiplet can carry greater aerodynamic loads and pressure loads for tangential onboard injectors. Further, with increased load carrying capability, mass may be reduced for lower weight and lower cost designs with enhanced life. Seals 79 may also be provided, respectively, between the static support 61b and the platform 74 of each of the CMC vane arc segments 160. In this example, the seals 79 are arranged at locations that are radially opposite the bearing surfaces 78. The seals 79 may serve to limit ingress of combustion gases from the core gas path and/or to provide a compressive pre-load on the CMC vane arc segments 160 once assembled. The seals 79 may be, but are not limited to, rope seals, C-springs, and E-springs.

As also shown in FIGS. 6 and 7 the second side wall 66 at the first radial end 70a also includes a ledge 80 that borders the bearing surface 78. The ledge 80 may act as a stop for the platform 74 that mates onto the bearing surface 78 and thus may bear the contact force between the segments 160. The ledge 80 may also serve as a stiffening structure to provide a relatively rigid region to support loads from the platform 74 of the mating CMC vane arc segment 160. Moreover, neither the bearing surface 78 nor the ledge 80 is cantilevered on a platform, as are mating features of a double-sided platform, which further facilitates stiffening.

Both the ledge 80 and the bearing surface 78 are contoured in the circumferential direction such that, along a chordal extent of the airfoil section 62, the ledge 80 and bearing surface 78 track the peripheral shape of the airfoil section 62. At or near the trailing end 68b, the portion of the platform 74 that contains the ledge 80 and bearing surface 78 may project circumferentially past the first side wall 66. Such contouring further facilitates interconnection of the CMC vane arc segments 160 by limiting relative circumferential movement between adjacent CMC vane arc segments 160. The opposite edge of the platform 74 that mates with the bearing surface 78 and ledge 80 of the next CMC vane arc segment 160 in the circumferential row is of complementary geometry to the contour of the bearing surface 78 and ledge 80 such that the edge of the platform 74 closely fits to the bearing surface 78 and ledge 80 of the mating segment 160.

In the example shown, the second side wall 66 also includes, at the second radial end 70b, an additional bearing surface 178. Each of the CMC vane arc segments 160 is situated with the edge region of the single-sided platform 76 bearing against the bearing surface 178 of the next of the CMC vane arc segments 160 in the circumferential row. In this manner, the CMC vane arc segments 160 are further interconnected. In this and in the further examples below, it is to be appreciated that the platforms 74/76 may be configured with both platforms 74/76 being pressure side, both platforms 74/76 being suction side, the platform 74 being pressure side and the platform 76 being suction side, or the platform 74 being pressure side and the platform 76 being suction side. The bearing surface 78/178 in each of the configurations will be on the opposite side from the respective platform 74/76.

Figure 8:
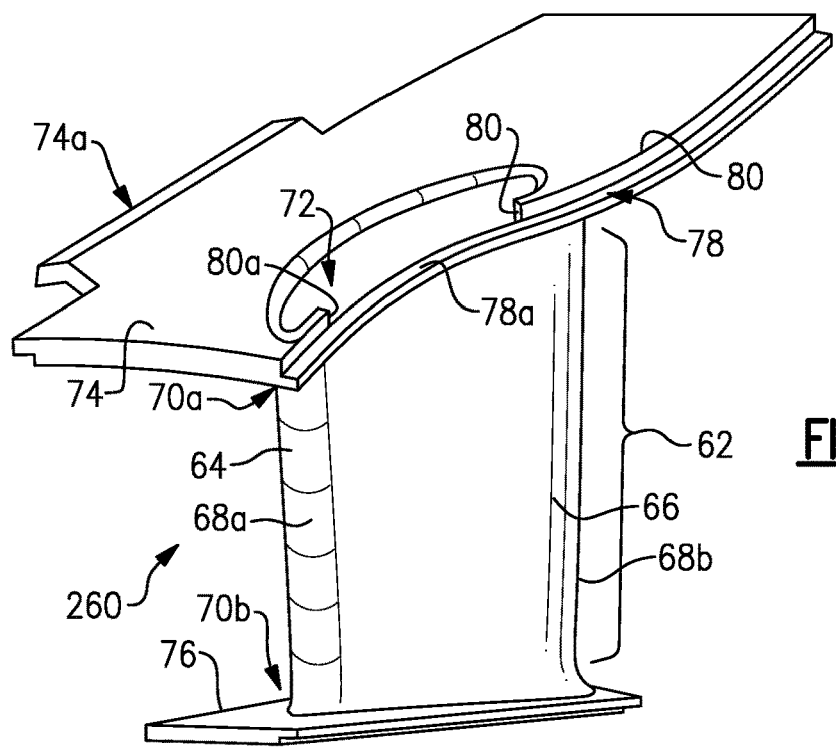
FIG. 8 illustrates an isolated view of another single-sided platform CMC vane arc segment that has a tab to interlock the segments.
Figure 9:
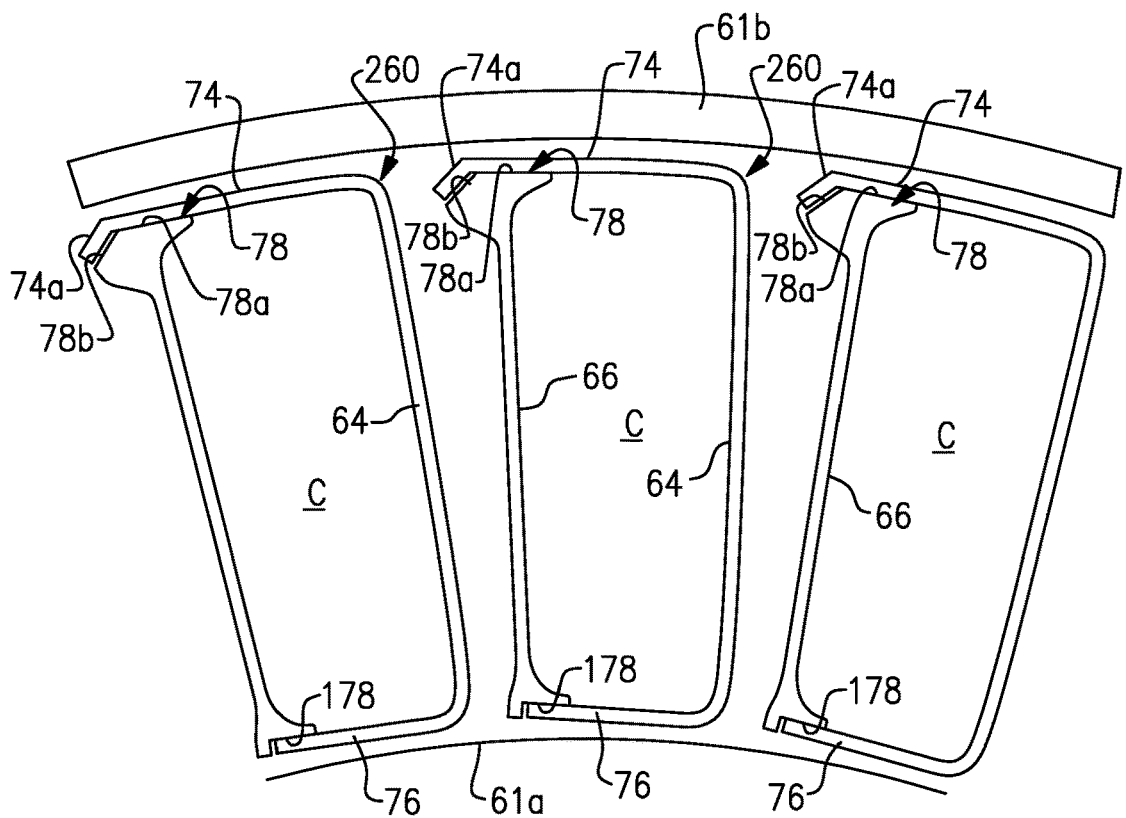
FIG. 9 illustrates an axial view of CMC vane arc segments as in FIG. 8.

FIG. 8 illustrates an isolated view of another example CMC vane arc segment 260, and FIG. 9 illustrates an axial view of a portion of a circumferential row of the CMC vane arc segments 260. The CMC vane arc segments 260 are similar to the segments 160 except that the bearing surface 78 is multi-faceted. As shown, the bearing surface 78 includes a first facet 78a and a second facet 78b. The second facet 78b overhangs the internal cavity 72. Additionally, the ledge 80 has a window 80a that opens to the internal cavity 72. On the opposite side of the platform 74 from the first side wall 64, the edge of the platform 74 includes a tab 74a projecting there from. The tab 74a is crooked to provide a hook structure. The tab 74a of each of the CMC vane arc segments 260 extends through the window 80a and bears against the second facet 78b of the next of the CMC vane arc segments 260 in the circumferential row. The hook structure of the tab 74a acts to catch at the second facet 78b, thereby interlocking the CMC vane arc segments 260 together to act as a multiplet unit. The interlocking limits movement in one circumferential direction. The CMC vane arc segments 260 at the end of the multiplet unit may be modified such that they do not interconnect with the end segments of the next multiplet unit in the circumferential row. For example, the end segments do not include the tab 74a, or other connecting structure in the further examples below.

Figure 10:
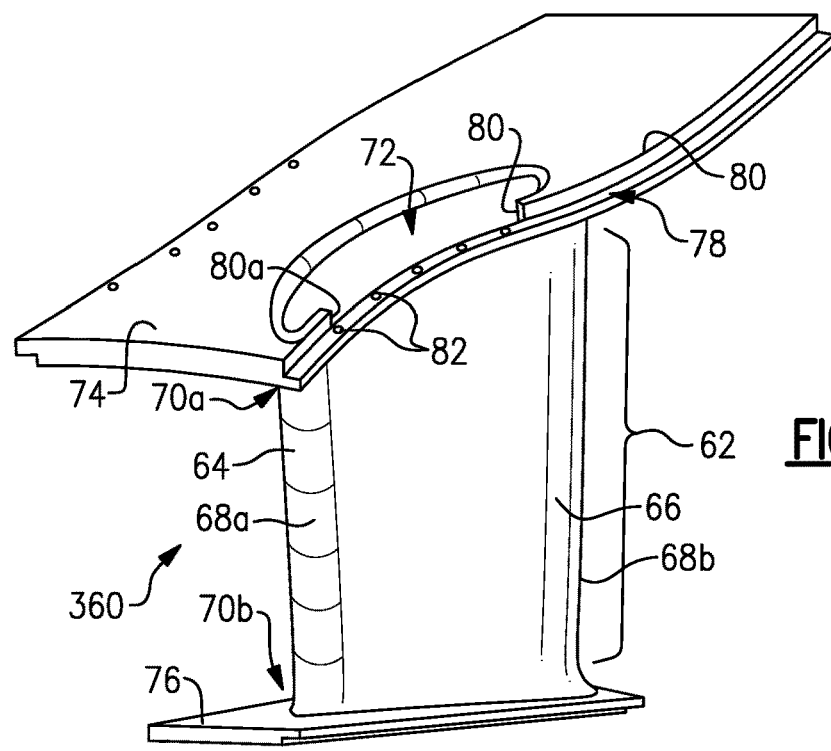
FIG. 10 illustrates an isolated view of another single-sided platform CMC vane arc segment that has a lock pin.
Figure 11:
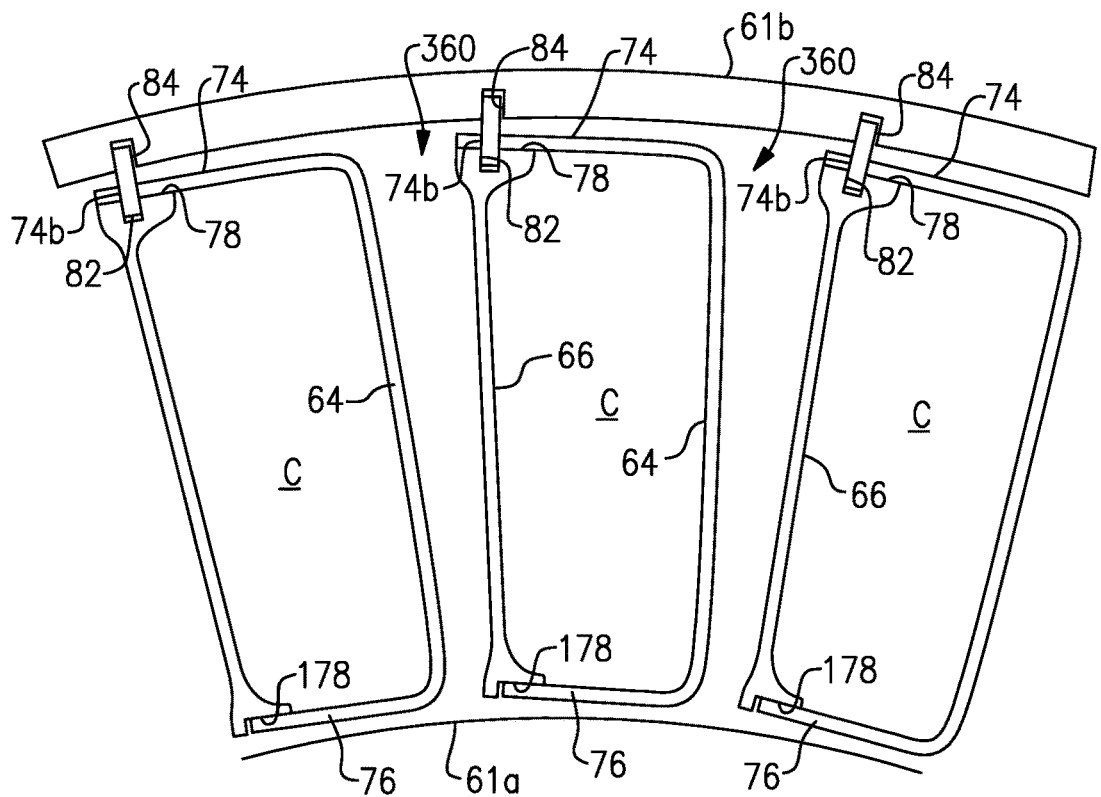
FIG. 11 illustrates an axial view of CMC vane arc segments as in FIG. 10.

FIG. 10 illustrates an isolated view of another example CMC vane arc segment 360, and FIG. 11 illustrates an axial view of a portion of a circumferential row of the CMC vane arc segments 360. The CMC vane arc segments 360 are similar to the segments 160 except that the bearing surface 78 includes one or more blind pin holes 82 and the platform 74 includes a platform pin hole 74b. The platform pin hole 74a of each of the CMC vane arc segments 360 is radially aligned with the blind pin hole 82 of the next of the CMC vane arc segments 360 in the circumferential row. A lock pin 84 extends through the aligned platform pin hole 74a and blind pin hole 82 to interlock the CMC vane arc segments 360 together. The lock pins 84 may further be anchored to the static structure 61b and may thus also serve as an anti-rotation feature that limits circumferential movement of the CMC vane arc segments 360. Alternatively, a slot may be machined into the bulbous lobe that can accept a linear seal strip. The seal strip would be inserted into a corresponding slot in the static structure. In this configuration, this feature acts to improve sealing and as an anti-rotation device, instead of being an interlocking feature.

The holes 74a/82 and pin or pins 84 may also be used in the example CMC vane arc segments 160/260/460 disclosed herein for additional interlocking of the CMC vane arc segments. It will also be noted that the CMC vane arc segments 360 include the windows in the ledges 80. Alternatively, if there are no structure that extend through the windows the windows 80a may be excluded such that the ledge 80 also extends along the edge of the internal cavity 72, which may provide additional surface that can be used to facilitate sealing.

Figure 12:
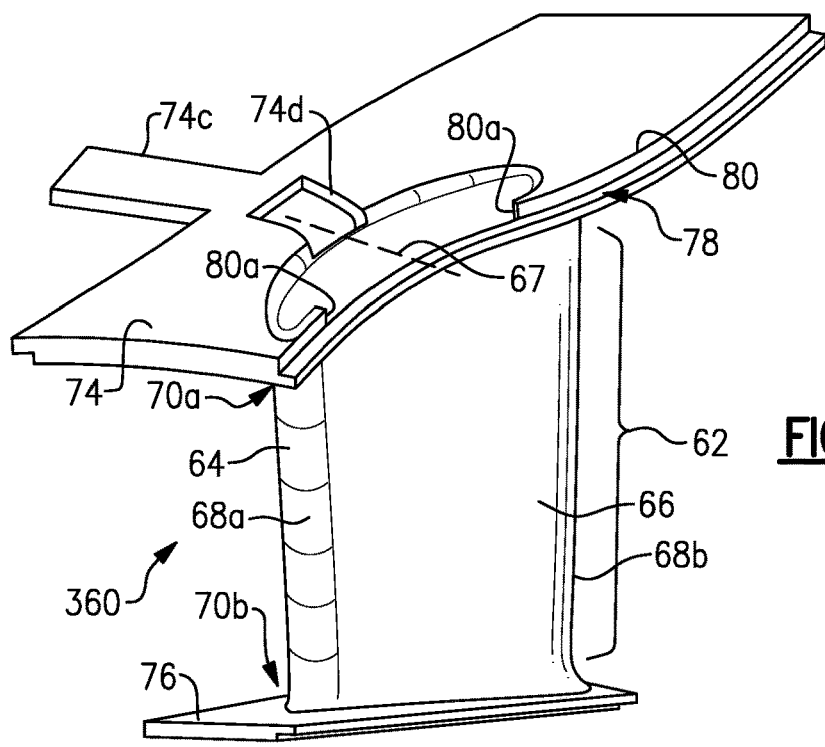
FIG. 12 illustrates an isolated view of another single-sided CMC vane arc segment that has a cantilevered arm.
Figure 13:
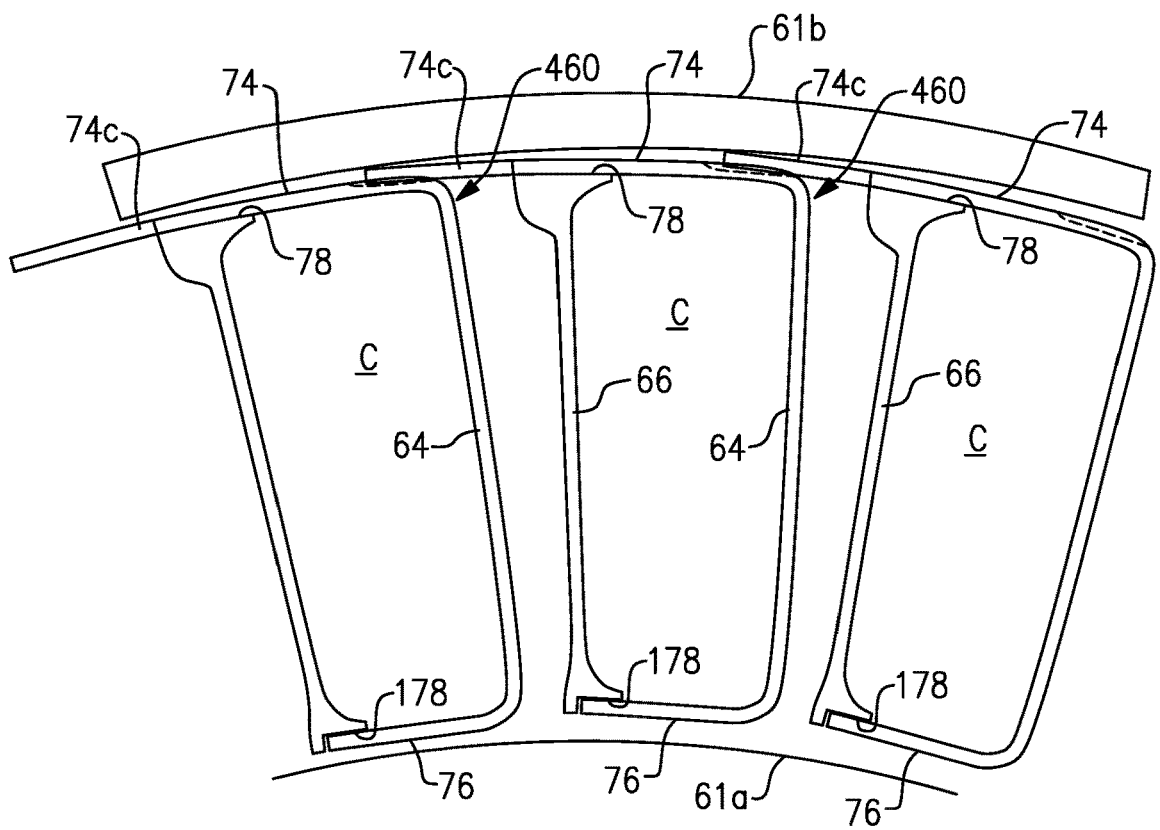
FIG. 13 illustrates an axial view of CMC vane arc segments as in FIG. 12.

FIG. 12 illustrates an isolated view of another example CMC vane arc segment 460, and FIG. 13 illustrates an axial view of a portion of a circumferential row of the CMC vane arc segments 460. The CMC vane arc segments 460 are similar to the segments 160 except that the edge of the platform 74 opposite from the first side wall 64 includes a cantilevered arm 74c and there is a lap joint slot 74d in the radially outer face of the platform 74. The cantilevered arm 74c of each of the CMC vane arc segments 460 is disposed in the lap joint slot 74d of the next of the CMC vane arc segments 460 in the circumferential row to form a lap joint there between that interlocks the CMC vane arc segments 460 as a full hoop structure.

In the illustrated example, the cantilevered arm 74c and lap joint slot 74d are located such that the cantilevered arm 74c is to extend through the window 80a and bridge across (as represented at dashed line 67) the internal cavity 72 of the next of the CMC vane arc segments 460 in the circumferential row. Alternatively, the cantilevered arm 74c and lap joint slot 74d may be moved forward or aft so as to avoid bridging the cavity 72, as bridging the cavity may interfere with air flow to the cavity. In a further example, the platform 74 includes multiple cantilevered arms 74c and lap joint slots 74d, for further interlocking.

Figure 14:
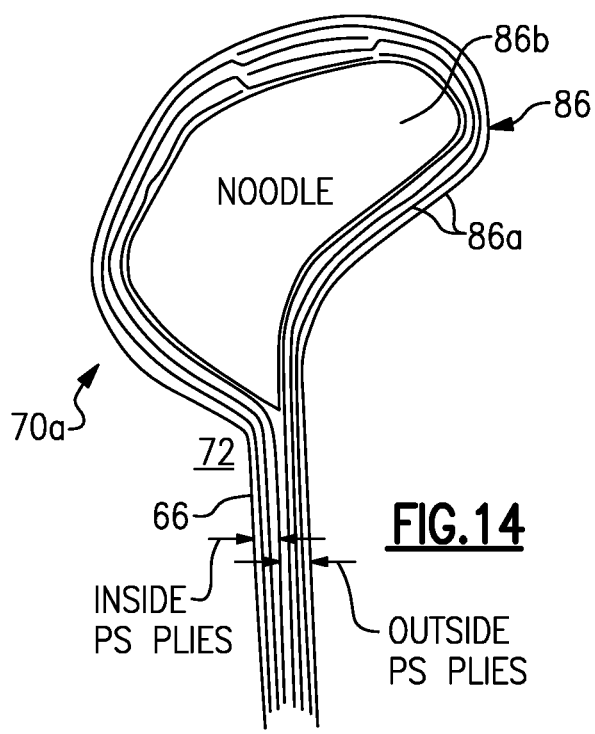
FIG. 14 illustrates a bulbous lobe for fabricating a CMC vane arc segment.

As depicted in FIG. 14, during the layup process to form the CMC vane arc segments disclosed herein, an over-sized, bulbous lobe 86 may be formed at the first radial end 70a of the second side wall 66. For example, fiber plies 86a from the second side wall 66 divide and wrap around a filler material 86b (often colloquially referred to as a noodle) to form the lobe 86. The filler material 86b may be formed of, but is not limited to, a CMC or a monolithic ceramic. The CMC or monolithic ceramic may be prefabricated prior to incorporation into the lobe 86 such that the fiber plies 86a are laid-up around the prefabricated CMC or monolithic ceramic.

Figure 15:
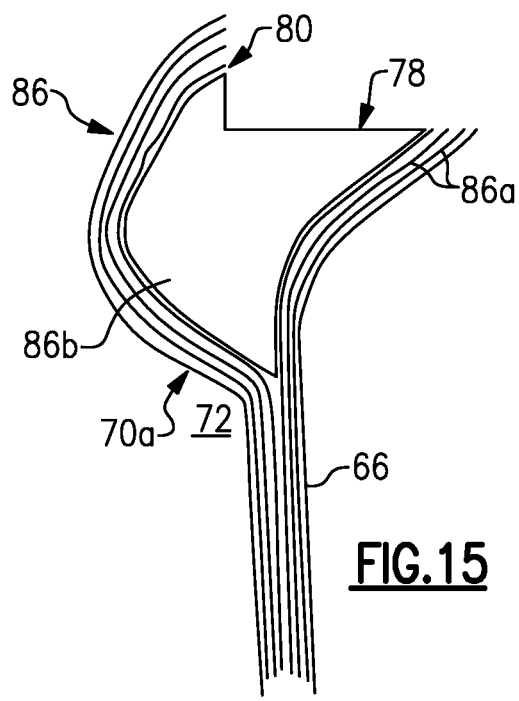
FIG. 15 illustrates a bearing surface and ledge fabricated from the bulbous lobe.

The lobe 86 is then machined to form the features described herein above. For instance, as shown in FIG. 15, the lobe 86 has been machined to provide the bearing surface 78 and the ledge 80. In this regard, as the machining is conducted through the filler material 86 and fiber plies 86a, a portion of the bearing surface 78 is formed by the fiber plies 86a and another portion of the bearing surface 78 is formed by a filler material 86b. Similarly, the face of the ledge 80 may also be formed from both the fiber plies 86a and the filler material 86b.

Figure 16:
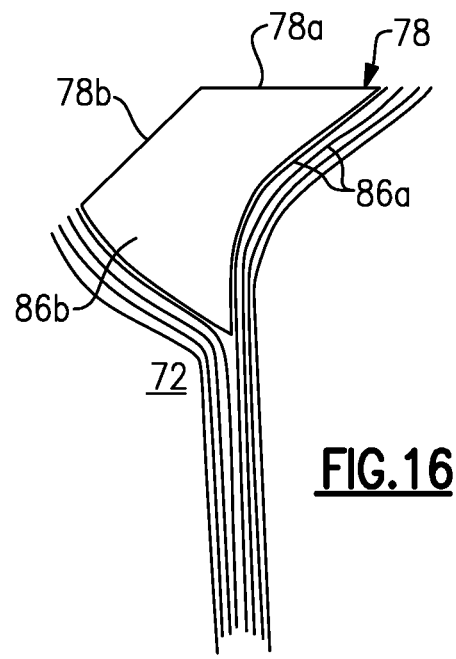
FIG. 16 illustrates a multi-faceted bearing surface fabricated from the bulbous lobe.

As shown in FIG. 16, the lobe 86 has been machined to provide the bearing surface 78, including the facets 78a/78b. Again, as above, the facets 78a/78b may be formed from both the fiber plies 86a and the filler material 86b.

Figure 17:
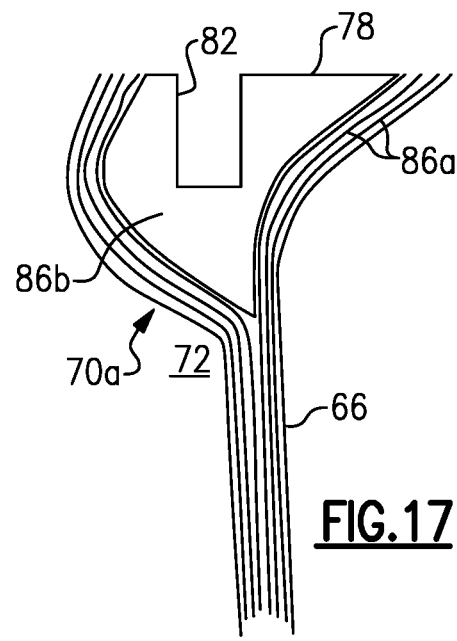
FIG. 17 illustrates a blind pin hole fabricated from the bulbous lobe.

As shown in FIG. 17, the lobe 86 has been machined to provide the bearing surface 78 and the blind pin hole 82. In this example, the bearing surface 78 is formed from both the fiber plies 86a and the filler material 86b, and the blind pin hole 82 is exclusively in the filler material 86b. Having the blind pin hole 82 exclusively in the filler material 86b may facilitate machining, as removal of only a single material is required (for a monolithic ceramic).

Figure 18:
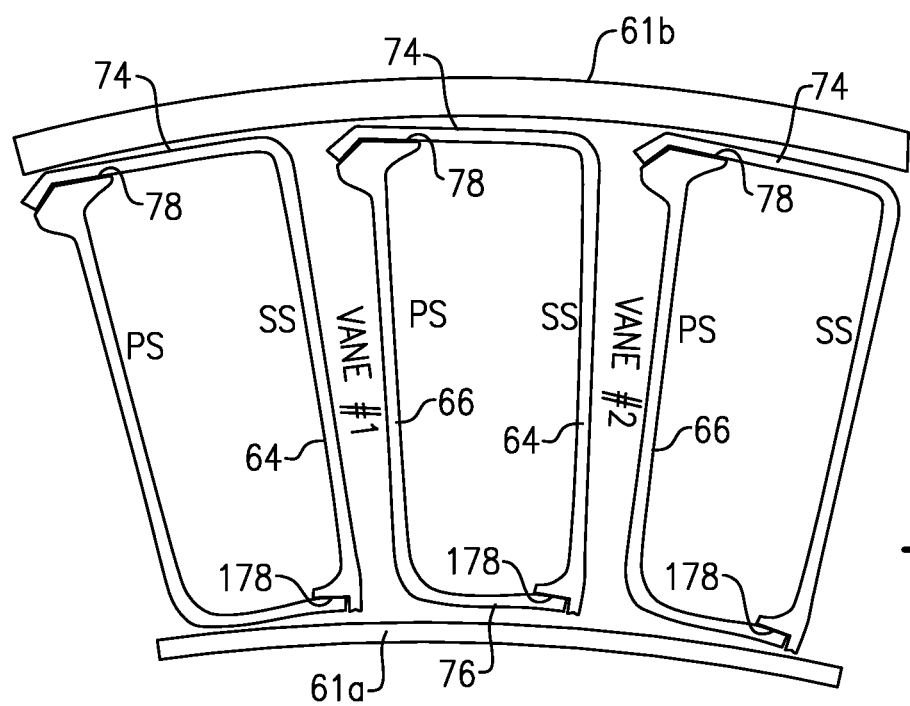
FIG. 18 illustrates a configuration in which single-sided platforms at the inner and outer radial end of the airfoil section extend in opposite directions and the edge of the inner platform is arranged outside of the core gas path.
Figure 19:
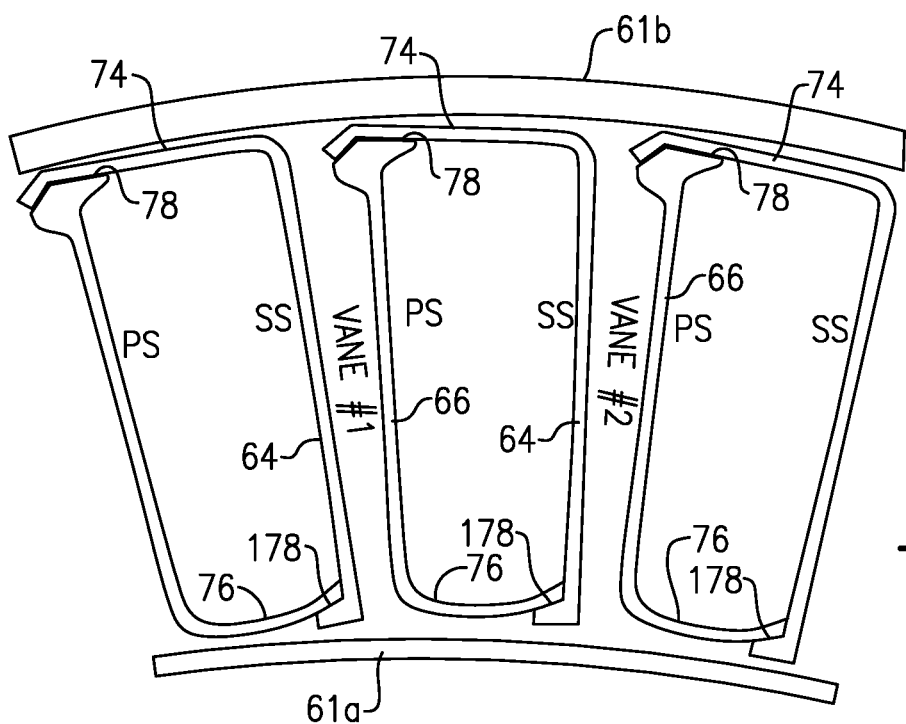
FIG. 19 illustrates a similar configuration as in FIG. 18 except that the edge of the inner platform is arranged inside of the core gas path.

In the examples of FIGS. 7, 9, 11, and 13, the single-sided platforms 74/76 both extend to the suction side and the platform 76 overlaps the bearing surface 178 such that the edge of the platform 76 is radially outside of core gas path C. FIGS. 18 and 19 demonstrate further examples that can be applied to any of the prior examples. In FIG. 18 the platform 76 extends off of the second side wall 66 to the pressure side and the bearing surface 178 is at the second radial end 70b of the first side wall 64. The edge of the platform 76 overlaps the bearing surface 178 such that the edge of the platform 76 is radially outside of core gas path C. In FIG. 19, the platform 76 also extends off of the second side wall 66 to the pressure side but the bearing surface 178 at the second radial end 70b of the first side wall 64 faces radially outwards instead of radially inwards. The edge of the platform 76 thus overlaps the bearing surface 178 such that the edge is radially inside of core gas path C. As will be appreciated from the further examples below, the configurations disclosed herein control how loads are transferred among the CMC vane arc segments and may this be used when designing a system to manipulate load management in the particular implementation.

Figure 20:
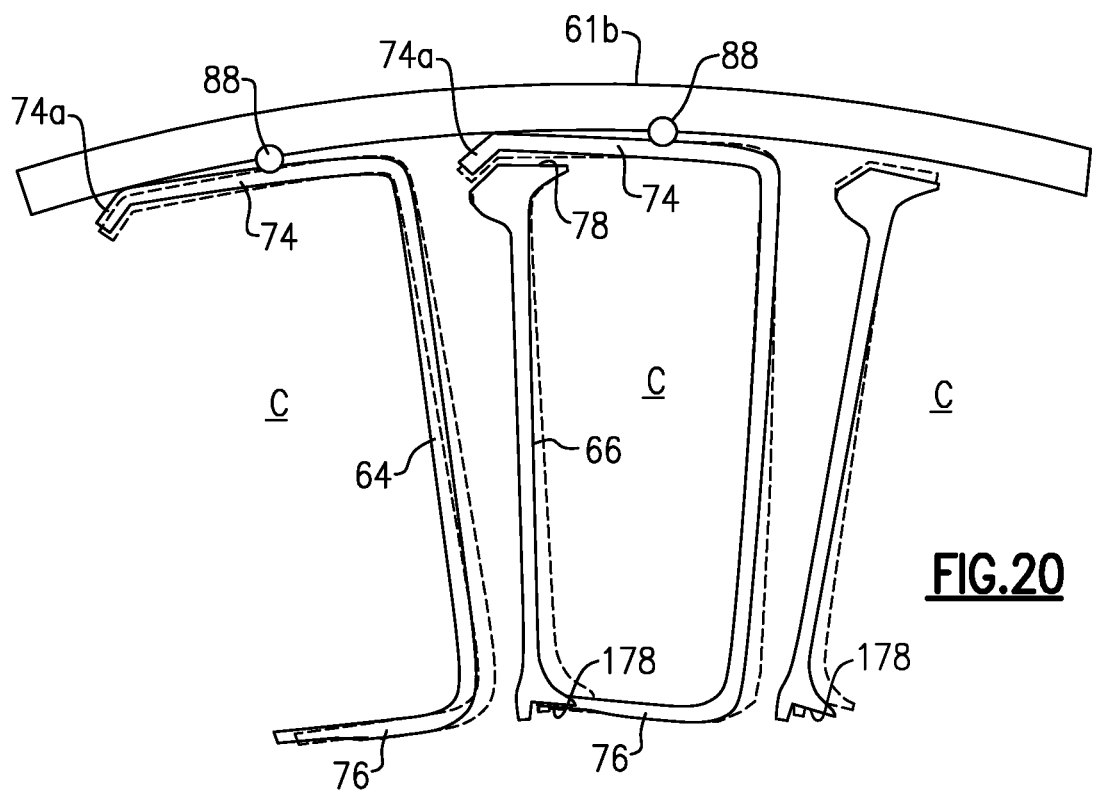
FIGS. 20, 21, 22, and 23 illustrate states of deformation under load for different configurations of single-sided platforms.

FIGS. 20, 21, 22, and 23 demonstrate states of deformation under load for different configurations. The dashed outlines represent the positions at rest, while the solid form lines represent a deflected state under load. In FIG. 20, anti-rotation features 88 are provided at the radially outer side of the platform 74. The anti-rotation features 88 are not particularly limited and may include pins flanges, or the like that are attached to the static structure 61b to prevent circumferential rotation of the CMC vane arc segments. Under aerodynamic loading the CMC vane arc segments tend to rotate about the features 88. In doing so, the platform 76 applies pressure to the bearing surface 178 that drives the second side wall 66 radially outwards. This places the second side wall 66 in compression, which is desirable for CMC materials, and also drives the bearing surface 78 to seat into the platform 74 and tab 74a. The resultant state is that the CMC vane arc segments are interlocked.

Figure 21:
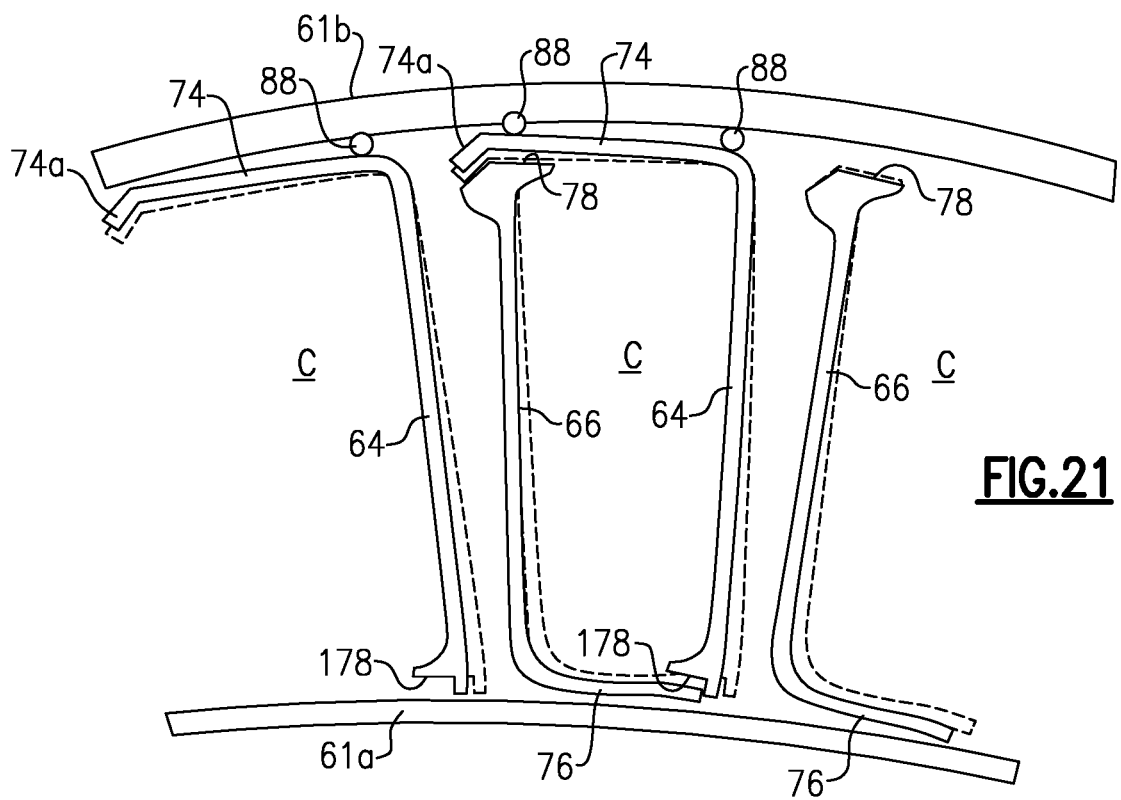

In the example in FIG. 21, the platform 76 is configured to be radially outside of the core gas path C. Under the aerodynamic loads the side walls 64/66 are in interlaminar compression, which is favorable. However, the deflection is such that the platform 76 separates from the bearing surface 178, providing modest or even poor interlocking. Accordingly, this configuration may be used where strong interlocking is not required.

Figure 22:
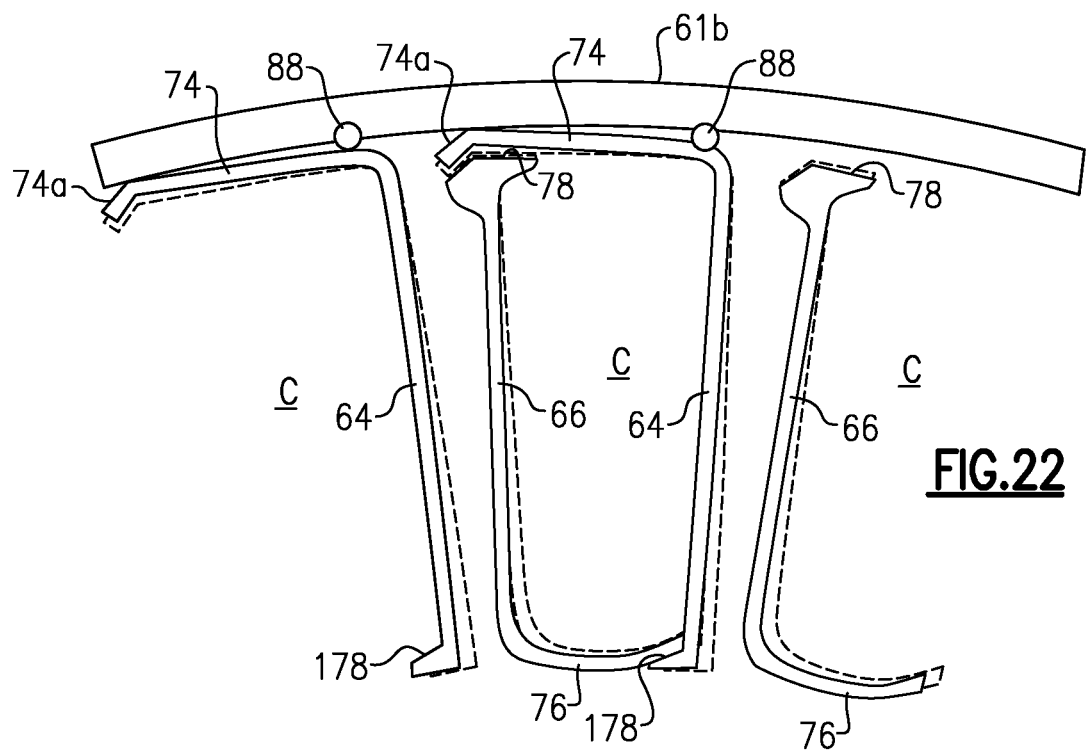

In contrast, the example in FIG. 22 is the same as in FIG. 21 except that the platform 76 is configured to be radially inside of the core gas path C. Again, under the aerodynamic loads the side walls 64/66 are favorably in interlaminar compression. However, rather than the separation as in the configuration of FIG. 21, the bearing surface 178 is driven into contact with the platform 178. Thus, there is less or no separation and stronger interlocking is provided.

Figure 23:
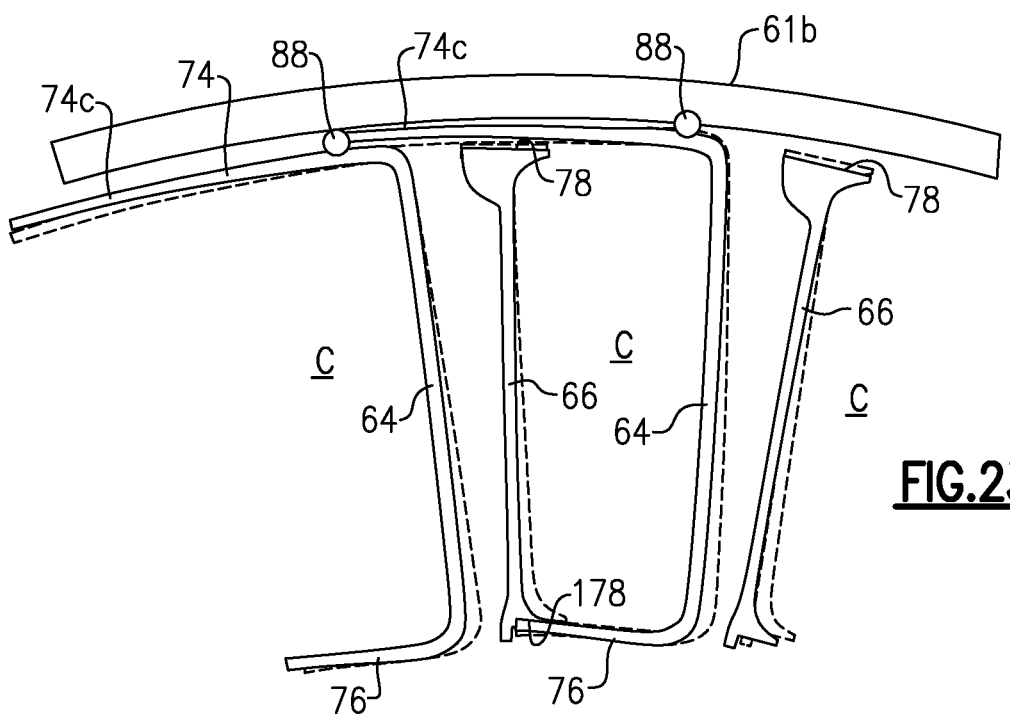

FIG. 23 demonstrates full hoop interlocking. Under aerodynamic loads the platform 76 applies pressure to the bearing surface 178 that drives the second side wall 66 radially outwards. This places the second side wall 66 in compression, which is desirable for CMC materials, and also drives the bearing surface 78 to seat into the platform 74. The cantilevered arm 74c also provide a large wheelbase. The resultant state is that the CMC vane arc segments are interlocked over the full hoop structure, i.e., every CMC vane arc segment is interlocked with the next segment in the circumferential row such that the segments act as a single unit that has a high load-carrying capacity.

Figure 24:
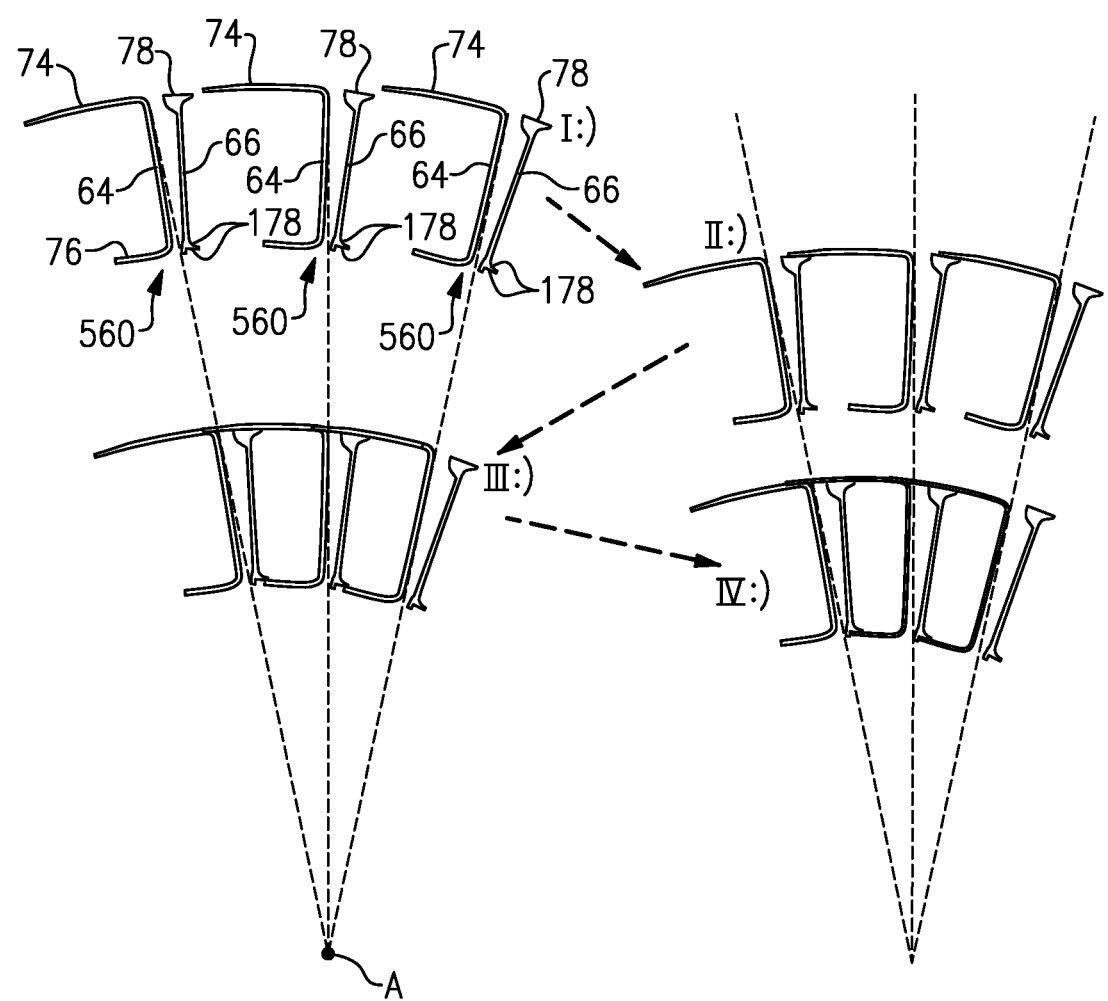
FIG. 24 illustrates a method of assembly for installing CMC vane arc segments that interlock.

FIG. 24 depicts a method of assembling the circumferential row of the CMC vane arc segments in the engine 20 through progressions I, II, III, and IV. Since the segments are interlocked with each other, they are not amendable to individual insertion into the circumferential row one-at-a-time. Rather, as shown at progression I, the CMC vane arc segments 560 are initially provided at circumferentially-spaced apart radial positions in a circumferential row about the central axis A. At progressions II and III the CMC vane arc segments 560 are moved radially inwardly toward the central axis A such that they become circumferentially closer together. Such movement may be conducted manually but more typically will be automated. During the movement, or at intervals between movement, alignment may be verified to ensure that the platforms 74/76 are in register with the bearing surfaces 78/178. Finally, at progression IV, the CMC vane arc segments 560 are moved to final radial positions in which one or both of the platforms 74/76 come to bear against the respective bearing surfaces 78/178 of the adjacent CMC vane arc segment 560. In further examples, where there is a relatively tight fit, the CMC vane arc segments 560 may be pre-loaded with a pre-stress. Tooling or other fixturing may be applied for the pre-loading. The pre-stress deflects the segments 560 and provides clearance for the segments 560 to fit together. The pre-stress is released after moving to the final radial positions such that the segments 560 elastically rebound toward their rest position, fully constrained by the static supports, and thereby interconnect together.

In general, there may be manufacturing benefits to producing a single-sided platform as disclosed herein. For example, fiber plies are transitioned from the airfoil to the single-sided platform in one direction rather than two directions as for a double-sided platform. Moreover, the fillet region between the airfoil section and the single-sided platform can be of higher quality due to the avoidance is discontinuities of the fiber plies during processing. Additionally, if there are attachment features that are to be provided in the single-sided platform the features only need to be placed on one side of the airfoil (instead of both). In double-sided platforms such features are often interrupted. A single-sided platform is also more flexible due than a double-sided platform due to the longer moment arm. In configurations that act as singlets such as that of FIG. 3, the bending forces on the platform fillets may result in interlaminar compression which facilitate reducing the likelihood of delamination of the CMC material.

Interconnected segments that act as multiplets, such as the configurations of FIGS. 9 and 11 can carry significantly more load than singlet configurations because the vanes combine to generate a much greater wheelbase that what can be achieved in a singlet vane. A multiplet unit facilitates installation into the engine 20 as a prefabricated unit. Interconnection of the CMC vane arc segments in a multiplet unit may provide high contact forces where the segments connect. Features such as the ledge 80 stiffen the platform 74 and may thus facilitate high contact forces to maintain tight interconnection. Some CMC vane designs require metal substructures for support of aerodynamic loads and loads due to a tangential onboard injector. A full hoop unit of interlocked CMC vane arc segments facilitates a further increase in load-carrying capability for supporting such loads without metal substructures.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
a plurality of ceramic matrix composite (CMC) vane arc segments arranged in a circumferential row, each of the CMC vane arc segments including
an airfoil section defining first and second side walls, leading and trailing ends, and first and second radial ends, the first and second side walls and leading and trailing ends defining an internal cavity,
wherein, at the first radial end, the airfoil section having a single-sided platform projecting in a circumferential direction from the first side wall and, also at the first radial end, the second side wall having a bulbous lobe defining a bearing surface, the bearing surface including a first facet and a second facet, the second facet overhanging the internal cavity, and
wherein the single-sided platform of each of the CMC vane arc segments in the circumferential row, the single-sided platform including an edge that has a hooked tab, the hooked tab received over the bulbous lobe of the next, adjacent one of the CMC vane arc segments in the circumferential row such that the hooked tab overhangs into the internal cavity of the next, adjacent one of the CMC vane arc segments in the circumferential row and bears against second facet of the bearing surface of that next, adjacent one of the CMC vane arc segments in the circumferential row.

2. The gas turbine engine as recited in claim 1, wherein the ledge has a window that opens to the internal cavity, the single-sided platform includes a circumferential side opposite the first side wall that has the hooked tab projecting there from, and the hooked tab of each of the CMC vane arc segments extends through the window, and bears against the second facet, of the next of the CMC vane arc segments in the circumferential row.

3. The gas turbine engine as recited in claim 1, wherein the bearing surface includes a blind pin hole, the single-sided platform includes a platform pin hole, the platform pin hole of each of the CMC vane arc segments is radially aligned with the blind pin hole of the next of the CMC vane arc segments in the circumferential row, and there a lock pin that extends through the platform pin hole and the blind pin hole.

4. The gas turbine engine as recited in claim 1, wherein CMC fiber plies from the second side wall divide to define a portion of the bearing surface and another portion of the bearing surface is formed by a filler material.

5. The gas turbine engine as recited in claim 1, wherein the first side wall is a suction side wall and the second side wall is a pressure side wall.

6. The gas turbine engine as recited in claim 5, wherein, at the second radial end, the airfoil section has an additional single-sided platform that projects from the first side wall in the circumferential direction away from the first side wall, and at the second radial end the second side wall has an additional bearing surface, and the additional single-sided platform of each of the CMC vane arc segments in the circumferential row is situated to bear against the additional bearing surface of the next of the CMC vane arc segments in the circumferential row.

7. The gas turbine engine as recited in claim 5, wherein, at the second radial end, the airfoil section has an additional single-sided platform that projects from the second side wall in the circumferential direction away from the second side wall, and at the second radial end the first side wall has an additional bearing surface, and the additional single-sided platform of each of the CMC vane arc segments in the circumferential row is situated to bear against the additional bearing surface of the next of the CMC vane arc segments in the circumferential row.

8. The gas turbine engine as recited in claim 7, wherein the seals are, respectively, radially opposite the bearing surface of each of the CMC vane arc segments.

9. The gas turbine engine as recited in claim 1, further comprising a static support that supports the CMC vane arc segments and seals that are disposed, respectively, between the static support and the single-sided platform of each of the CMC vane arc segments.

10. The gas turbine engine as recited in claim 1, wherein the CMC vane arc segments are formed of silicon carbide fibers disposed in a silicon carbide matrix.

11. The gas turbine engine as recited in claim 1, further comprising a compressor section, a combustor in fluid communication with the compressor section, and a turbine section in fluid communication with the combustor, wherein the CMC vane arc segments are in the turbine section.

12. The gas turbine engine as recited in claim 1, wherein, at the first radial end, the second side wall includes a ledge that borders the bearing surface, and the single-sided platform of each of the CMC vane arc segments in the circumferential row is situated to bear against the ledge of the next of the CMC vane arc segments in the circumferential row.

13. The gas turbine engine as recited in claim 1, wherein both the first facet and the second facet are radially-outwardly-facing surfaces.

14. The gas turbine engine as recited in claim 1, wherein, at the second radial end, the airfoil section has an additional single-sided platform that projects from the first side wall in an opposite circumferential direction from the single-sided platform at the first radial end, and at the second radial end the second side wall has an additional bearing surface, and the additional single-sided platform of each of the CMC vane arc segments in the circumferential row is situated to bear against the additional bearing surface of the next of the CMC vane arc segments in the circumferential row.

15. A method of assembly, comprising:
providing a plurality of ceramic matrix composite (CMC) vane arc segments, each of the CMC vane arc segments includes an airfoil section that defines first and second side walls, leading and trailing ends, and first and second radial ends, the first and second side walls and leading and trailing ends define an internal cavity, at the first radial end the airfoil section has a single-sided platform that projects from the first side wall in a circumferential direction away from the airfoil section, the single-sided platform including an edge that has a hooked tab, and the second side wall has a bulbous lobe defining a bearing surface that includes a first facet and a second facet, and the second facet overhangs the internal cavity, and;
positioning the CMC vane arc segments at circumferentially-spaced apart radial positions in a circumferential row about a central axis; and
moving the CMC vane arc segments radially inwardly toward the central axis from the circumferentially-spaced apart radial positions to final radial positions, wherein during the moving the CMC vane arc segments move toward one another such that the hooked tab of each single-sided platform of each of the CMC vane arc segments comes to bear against the first facet and the second facet of the bearing surface of the next of the CMC vane arc segments in the circumferential row.

16. The method as recited in claim 15, wherein the CMC vane arc segments are pre-loaded with a pre-stress, and the pre-stress is released after the moving to the final radial position.

* * * * *